F. A. SMITH & D. L. O'BRIEN.
INVALID'S TABLE.
APPLICATION FILED MAY 18, 1909.
937,480.
Patented Oct. 19, 1909.
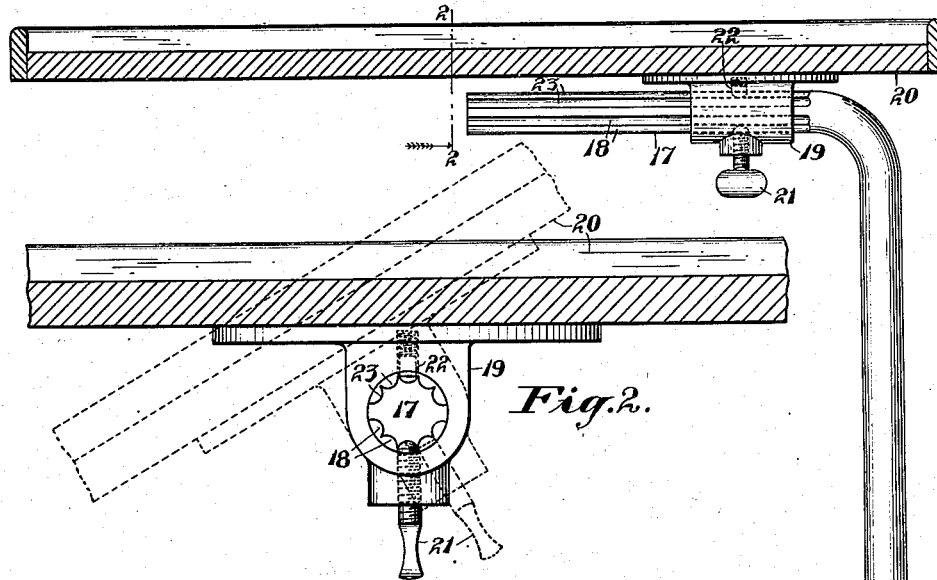
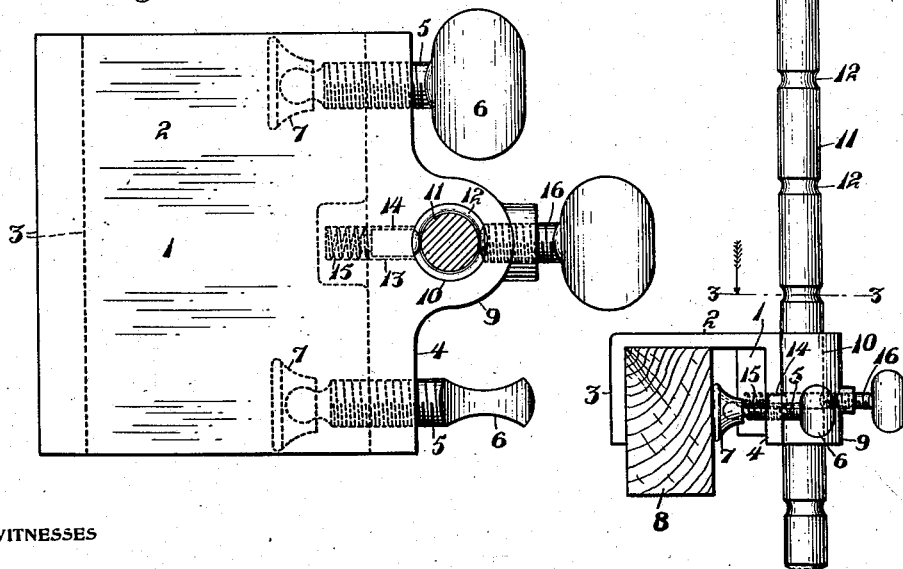

UNITED STATES PATENT OFFICE.

FERNANDO A. SMITH AND DANIEL L. O'BRIEN, OF SAN FRANCISCO, CALIFORNIA.

INVALID'S TABLE.

937,480.  Specification of Letters Patent.  Patented Oct. 19, 1909.

Application filed May 18, 1909. Serial No. 496,701.

*To all whom it may concern:*

Be it known that we, FERNANDO A. SMITH and DANIEL L. O'BRIEN, citizens of the United States, residing at San Francisco, in the county of San Francisco and State of California, have invented new and useful Improvements in Invalids' Tables, of which the following is a specification.

The present invention relates to improvements in tables for use by persons lying in bed.

The object of the invention is to provide a table of this character which can be attached directly to the bed, can be constructed at a comparatively small cost, and can be easily and quickly adjusted as to its height, its lateral position, and the magnitude and direction of its inclination.

While the device is of particular utility for invalids, it is also of value as a book rest to be attached to the arm of a chair.

In the accompanying drawing, Figure 1 is a vertical section showing the apparatus in use; Fig. 2 is a vertical section on the line 2—2 of Fig. 1; Fig. 3 is an enlarged horizontal section on the line 3—3 of Fig. 1.

Referring to the drawing, 1 indicates a clamp, having a top or middle plate 2, an inner flange or wall 3, and an outer flange or wall 4. Through the latter flange are screwed thumb screws 5, having rounded heads 6, entering sockets in shoes 7, which are adapted to fit against the side of the article of furniture 8, such as the arm of a chair or the side of a bedstead, to which the device is to be attached. Said clamp is also formed on the outer side with a central extension 9, having a vertical aperture or slideway 10, through which can slide a post 11. Said post is formed with a series of annular grooves 12, and in said clamp is formed a socket 13 within which is received a bolt 14 connected at its inner end to a coiled spring 15 secured within said socket. Said spring projects said bolt a short distance into the slideway 10, so that its outer end can engage, in turn, the grooves 12 in the post, as the latter is raised or lowered for the purpose of adjustment; but, since said outer end is rounded, the bolt readily slips out of each groove as the post is moved vertically. The person adjusting the device is informed by the sense of touch, when the bolt engages any one of the grooves, and he can then, if desired, secure the post in that position of extension by screwing in a thumb screw 16, the rounded inner end of which can enter said groove. The screw 16 does not, however, prevent the post from being turned freely on its axis.

The upper end of the post is bent at right angles to form an arm 17, and the surface of the arm is grooved longitudinally, as shown at 18. On said arm can slide a sleeve 19 secured to the under side of a table 20, and a thumb screw 21 is screwed through a boss on said sleeve and is adapted to enter any one of the grooves 18 in the arm and thereby retain the table in the corresponding position either horizontal or inclined. This sleeve 19, like the clamp 1, is provided with a spring actuated bolt 22 adapted to enter any one of a series of longitudinal grooves 23 in the arm corresponding with the several positions of angular adjustment of the table on the arm. It will be seen that, by this arrangement, any desired adjustment may be easily and quickly obtained of the table, as to height, lateral position over the bed or chair, inclination to the horizontal, and direction of slope.

We claim:—

1. A device of the character described, comprising a clamp having a vertical bearing, a post in said bearing having a series of annular grooves and bent at the top to form a horizontal arm, a bolt in a socket in said clamp and having a rounded outer end, a spring in said socket adapted to project said bolt a short distance only into said bearing to enter one of said grooves of the post when in said bearing, a screw screwed through said clamp and also adapted to enter one of said grooves, and a table secured upon the upper end of said arm, substantially as described.

2. A device of the character described, comprising a clamp having a vertical bearing, a post in said bearing having a series of annular grooves and bent at the top to form a horizontal arm, said arm being longitudinally grooved, a bolt in a socket in said clamp and having a rounded outer end, a spring in said socket adapted to project said bolt a short distance only into said bearing to enter one of said grooves of the post when in said bearing, a screw screwed through said clamp and also adapted to enter one of said grooves, a table, a sleeve secured to said table and slidable upon said arm, a spring actuated bolt in a socket in said sleeve, and a screw screwed through said sleeve and adapted to enter any one of the grooves in said arm, substantially as described.

In testimony whereof we have hereunto set our hands in the presence of two subscribing witnesses.

FERNANDO A. SMITH.
DANIEL L. O'BRIEN.

Witnesses:
F. M. WRIGHT,
D. B. RICHARDS.